US008922680B2

(12) United States Patent
Hoda et al.

(10) Patent No.: US 8,922,680 B2
(45) Date of Patent: Dec. 30, 2014

(54) IMAGE PROCESSING APPARATUS AND CONTROL METHOD FOR IMAGE PROCESSING APPARATUS

(75) Inventors: Saori Hoda, Tokyo (JP); Yoshiaki Honda, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/521,372

(22) PCT Filed: Feb. 18, 2011

(86) PCT No.: PCT/JP2011/054217
§ 371 (c)(1),
(2), (4) Date: Jul. 10, 2012

(87) PCT Pub. No.: WO2011/118329
PCT Pub. Date: Sep. 29, 2011

(65) Prior Publication Data
US 2012/0281123 A1    Nov. 8, 2012

(30) Foreign Application Priority Data

Mar. 26, 2010   (JP) .................................. 2010-073472

(51) Int. Cl.
*H04N 9/64*     (2006.01)
*H04N 5/367*    (2011.01)

(52) U.S. Cl.
CPC .................................. *H04N 5/3675* (2013.01)
USPC ......................................................... 348/246

(58) Field of Classification Search
USPC ......................................................... 348/246
See application file for complete search history.

(56) References Cited

U.S. PATENT DOCUMENTS

| 7,460,688 B2 | 12/2008 | Stanback et al. |
| 8,810,695 B2 | 8/2014 | Yamaguchi |
| 2004/0096125 A1* | 5/2004 | Alderson et al. ............... 382/312 |
| 2009/0281754 A1 | 11/2009 | Takatori |

FOREIGN PATENT DOCUMENTS

| CN | 1767660 A | 5/2006 |
| CN | 101464418 A | 6/2009 |
| CN | 101677359 A | 3/2010 |

(Continued)

OTHER PUBLICATIONS

Dec. 12, 2013 Russian Search Report for Russian Patent Application No. 2012145612.

(Continued)

*Primary Examiner* — Roberto Velez
*Assistant Examiner* — Stephen Coleman
(74) *Attorney, Agent, or Firm* — Fitzpatrick, Cella, Harper & Scinto

(57) ABSTRACT

The present invention provides an image processing apparatus for detecting, from image data generated by an image sensor constituted by a plurality of pixels, a signal from a defective pixel of the image sensor, including first determination means for obtaining a first determination value indicating a magnitude of a difference in signal level between a pixel of interest and a plurality of pixels located in the neighborhood of the pixel of interest, second determination means for obtaining a second determination value indicating a width of distribution of the difference in signal level between the pixel of interest and the plurality of pixels located in the neighborhood of the pixel of interest, and detection means for detecting whether or not the signal from the pixel of interest is a defective pixel signal, using the first determination value and the second determination value.

16 Claims, 12 Drawing Sheets

(56) References Cited

FOREIGN PATENT DOCUMENTS

| JP | 2001-086517 A | 3/2001 |
| JP | 2004-297267 A | 10/2004 |
| JP | 2005-123946 A | 5/2005 |
| JP | 2005-341244 A | 12/2005 |
| JP | 2008-131161 A | 6/2008 |

OTHER PUBLICATIONS

Chinese Official Action dated Oct. 20, 2014, issued in counterpart Chinese Patent Application No. 201180016308.X, with an English translation.

* cited by examiner

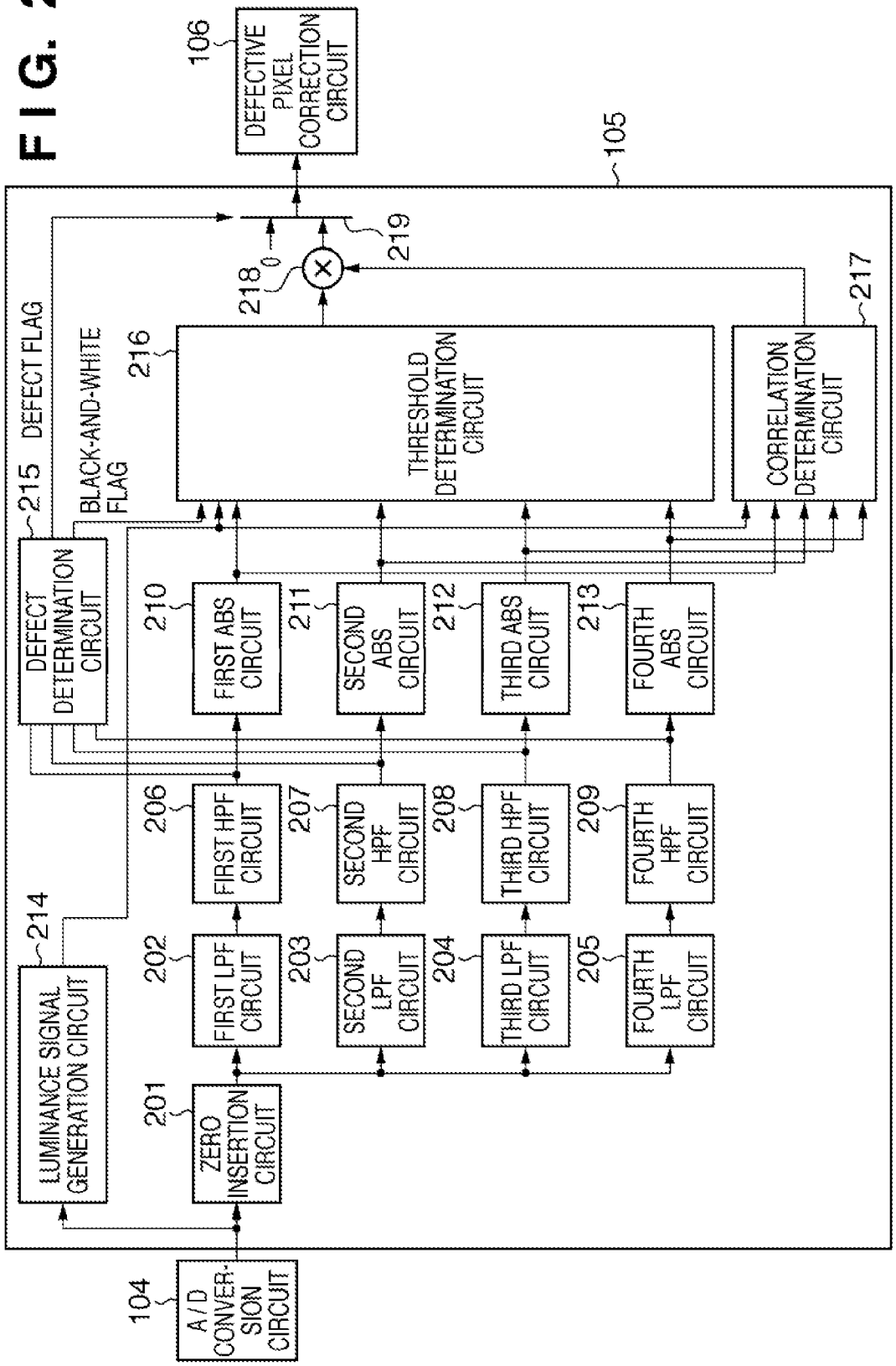

FIG. 3A FIG. 3B FIG. 3F
FIG. 3C FIG. 3G
FIG. 3D FIG. 3H
FIG. 3E FIG. 3I

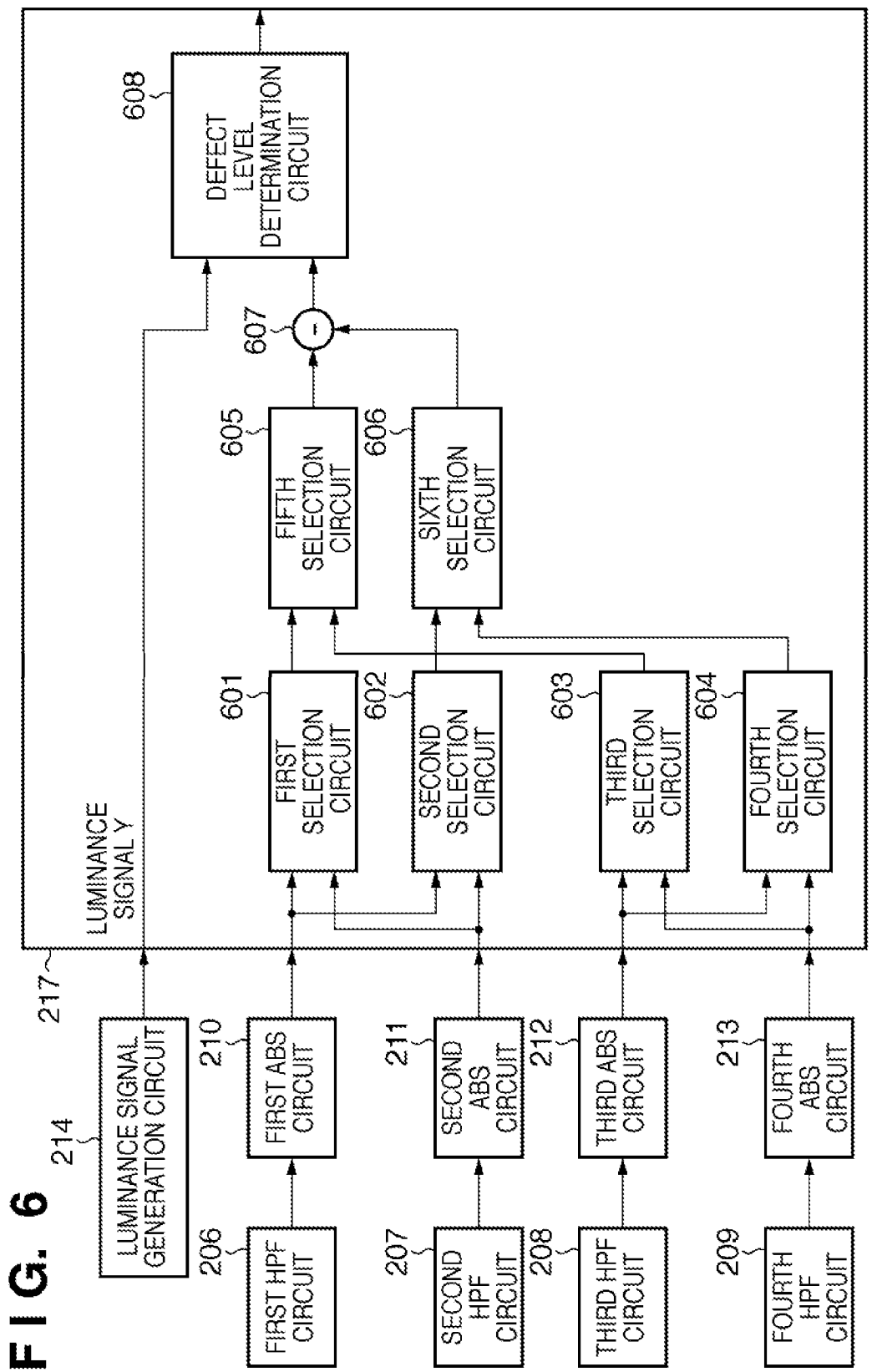

IMAGE PROCESSING APPARATUS AND CONTROL METHOD FOR IMAGE PROCESSING APPARATUS

TECHNICAL FIELD

The present invention relates to an image processing apparatus that detects a signal from a defective pixel in an image sensor, and a control method for the image processing apparatus.

BACKGROUND ART

Imaging apparatuses such as digital cameras or digital video cameras generally employ CCD sensors or CMOS sensors as image sensors in which color filters are arranged. With such image sensors, there are cases where a defective pixel (also called a "flicker defect") occurs due to structural factors, factors occurring during the process of manufacture, external factors occurring after manufacture, and so on. For example, one example of the factors that produce defective pixels in a CMOS sensor is noise occurring in a floating diffusion where charges are received from photodiodes. Such noise does not always occur periodically, so sometimes noise may occur at frequent intervals such as every few times imaging is performed, and sometimes noise may occur at infrequent intervals such as every few years. It is also known that the frequency of occurrence of defective pixels in an image sensor does not depend on the temperature and the charge accumulation time.

In view of this, techniques for detecting a defective pixel in an image sensor have been proposed in Japanese Patent Laid-Open Nos. 2004-297267 and 2001-086517. With these techniques, it is possible to detect not only a defective pixel occurring at a specific position during the process of manufacture, but also a defective pixel occurring after manufacture. For example, Japanese Patent Laid-Open No. 2004-297267 discloses a technique for obtaining, for each color filter, a difference in signal level between a pixel of interest and a plurality of neighboring pixels of the pixel of interest, and, if all of the differences are greater than or equal to a threshold, detecting the pixel of interest as a defective pixel. Japanese Patent Laid-Open No. 2001-086517 discloses a technique for obtaining luminance values of all the pixels regardless of the color of color filters, and if a difference in luminance level between a pixel of interest and a plurality of neighboring pixels is greater than or equal to a threshold, detecting the pixel of interest as a defective pixel.

However, with the conventional techniques, a defective pixel occurring in an image sensor cannot be detected with high precision. For example, with the technique disclosed in Japanese Patent Laid-Open No. 2004-297267, in the case where highly sensitive imaging is performed, the amplification factor of image data (image signal) is increased and accordingly a noise component included in the image data is amplified as well, so in some cases the noise component may be more prominent than the signal levels of the neighboring pixels of the pixel of interest. In particular, there is a higher possibility, in a region where the spatial frequency of an object is low, that such a noise component will have a greater value than the signal levels of the neighboring pixels of the pixel of interest, and as a result, the difference in signal level between the pixel of interest and the neighboring pixels becomes greater than a threshold, and the pixel of interest may be mis-detected as a defective pixel. Note that, although it is conceivable that the threshold is set to a high value in order to avoid such mis-detection, it is difficult in a region where the signal level is high to detect a defective pixel because the difference in signal level between the pixel of interest and the neighboring pixels is small (less apparent). Similar problems to Japanese Patent Laid-Open No. 2004-297267 also arise with the technique disclosed in Japanese Patent Laid-Open No. 2001-086517.

SUMMARY OF INVENTION

The present invention provides technology for detecting a defective pixel in an image sensor with high precision.

According to one aspect of the present invention, there is provided an image processing apparatus for detecting, from image data generated by an image sensor constituted by a plurality of pixels, a signal from a defective pixel of the image sensor, including first determination means for obtaining a first determination value indicating a magnitude of a difference in signal level between a pixel of interest and a plurality of pixels located in the neighborhood of the pixel of interest, second determination means for obtaining a second determination value indicating a width of distribution of the difference in signal level between the pixel of interest and the plurality of pixels located in the neighborhood of the pixel of interest, and detection means for detecting whether or not the signal from the pixel of interest is a defective pixel signal, using the first determination value and the second determination value, wherein the first determination value is a value that increases as the magnitude of the difference increases, and the second determination value is a value that increases as the width of distribution of the magnitude of the difference decreases, and the detection means detects the signal from the pixel of interest as a defective pixel signal when both the first determination value and the second determination value are greater than or equal to a predetermined threshold.

Further aspects of the present invention will become apparent from the following description of exemplary embodiments with reference to the attached drawings.

BRIEF DESCRIPTION OF DRAWINGS

FIG. 2 is a schematic block diagram showing the configuration of a defective pixel detection circuit in the imaging apparatus shown in FIG. 1.

FIGS. 3A to 3I are diagrams illustrating processing performed by a zero insertion circuit, LPF circuits, and HPF circuits in the defective pixel detection circuit shown in FIG. 2.

FIG. 6 is a schematic block diagram showing the configuration of a correlation determination circuit in the defective pixel detection circuit shown in FIG. 2.

DESCRIPTION OF EMBODIMENTS

Figure 1:
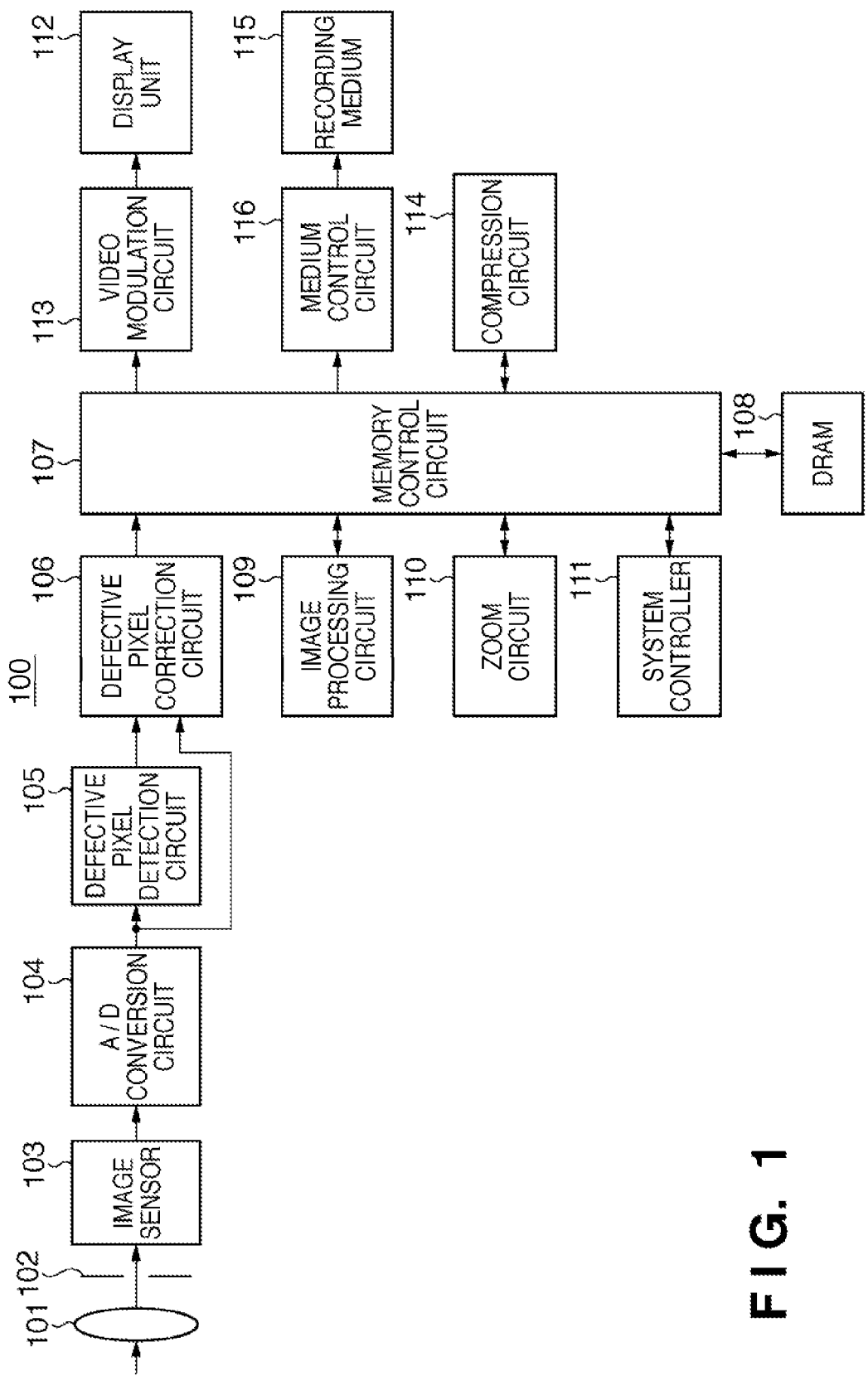
FIG. 1 is a schematic block diagram showing the configuration of an imaging apparatus to which an image processing apparatus, which is an aspect of the present invention, is applied.

Preferred embodiments of the present invention will be described below with reference to the accompanying drawings. Note that the same reference numerals denote the same members throughout the drawings, and a repetitive description thereof will not be given.

FIG. 1 is a schematic block diagram showing the configuration of an imaging apparatus 100 to which an image processing apparatus, which is an aspect of the present invention, is applied. The imaging apparatus 100 is an imaging apparatus for capturing an image of an object and is embodied as a digital camera in the present embodiment.

The imaging apparatus 100 includes an imaging lens 101, an aperture 102, an image sensor 103 in which R (red), G (green) and B (blue) color filters are arranged, and an A/D conversion circuit 104 that converts an analog image signal (electric signal) received from the image sensor 103 into digital image data. The imaging apparatus 100 also includes a defective pixel detection circuit 105 serving as an image processing apparatus that detects a signal from a defective pixel (such as a flicker defect) in the image sensor 103. The imaging apparatus 100 also includes a defective pixel correction circuit 106 that performs correction on a signal that has been detected as the output from a defective pixel by the defective pixel detection circuit 105. The imaging apparatus 100 also includes a memory control circuit 107 that performs bus arbitration among circuits, a DRAM 108 that temporarily stores image data, and an image processing circuit 109 that performs image processing such as color conversion processing and sharpness processing. The imaging apparatus 100 also includes a zoom circuit 110 that reduces or enlarges image data, a system controller 111 that determines parameters and the mode of each circuit, and a display unit 112 that displays (reproduces) an image corresponding to image data. The imaging apparatus 100 further includes a video modulation circuit 113 that modulates an image signal so as to display an image on the display unit 112, and a compression circuit 114 that performs compression processing on image data. The imaging apparatus 100 further includes a detachable recording medium 115 that records image data that has been compressed by the compression circuit 114, and a medium control circuit 116 serving as an interface with the recording medium 115.

Light incident on the imaging lens 101 (object light) is incident on the image sensor 103 after having been properly exposed through the aperture 102, and is converted into an electric signal by the image sensor 103. The electric signal of the object light generated by the image sensor 103 is converted from an analog image signal to digital image data by the A/D conversion circuit 104.

The image data constituted by signals output from a plurality of pixels and generated through the image sensor 103 and the A/D conversion circuit 104, is input into the defective pixel detection circuit 105 which detects a signal of a defective pixel included in the image data. The signal detected as the output from a defective pixel by the defective pixel detection circuit 105 is input into the defective pixel correction circuit 106 which corrects the signal by interpolation with reference to the signals from pixels located in the neighborhood of the pixel that has been detected as a defective pixel.

The image data obtained by the defective pixel correction circuit 106 correcting the signal detected as the output from a defective pixel is written to the DRAM 108 via the memory control circuit 107. The image data that is written in the DRAM 108 is read out by the image processing circuit 109 via the memory control circuit 107.

In the image processing circuit 109, the image data read from the DRAM 108 undergoes color conversion processing, sharpness processing and so on, and is converted into image data including a luminance signal and a color-difference signal. The image data processed by the image processing circuit 109 is written to the DRAM 108 via the memory control circuit 107. The image data that is written in the DRAM 108 is read out by the zoom circuit 110 via the memory control circuit 107.

The zoom circuit 110 changes the magnification of image data to, for example, 720×240 in order to display an image corresponding to the image data on the display unit 112. The image data enlarged or reduced by the zoom circuit 110 is written to the DRAM 108 via the memory control circuit 107. The image data that is written in the DRAM 108 is read out by the video modulation circuit 113 via the memory control circuit 107.

The video modulation circuit 113 performs encoding of image data. The image data processed by the image processing circuit 109 is displayed as an image on the display unit 112.

In the case where image data is written to the recording medium 115, the zoom circuit 110 enlarges or reduces the size of image data that was read out from the DRAM 108 (image data that was read out after having been processed by the image processing circuit 109 and written to the DRAM 108) to a predetermined size. The image data whose magnification has been changed by the zoom circuit 110 is written to the DRAM 108 via the memory control circuit 107. The image data that is written in the DRAM 108 is read out by the compression circuit 114 via the memory control circuit 107.

The compression circuit 114 compresses image data that was read out from the DRAM 108 with a compression method such as JPEG. The image data compressed by the compression circuit 114 is written to the DRAM 108 via the memory control circuit 107 and is then read out by the medium control circuit 116. The medium control circuit 116 writes (records) the image data compressed by the compression circuit 114 into the recording medium 115.

With reference to FIG. 2, a detailed description is given of the defective pixel detection circuit 105 that detects a signal from a defective pixel in the image sensor 103, using image data generated through the image sensor 103 and the A/D conversion circuit 104. As mentioned above, since the image sensor 103 has arranged therein a Bayer array of color filters, the image data generated through the image sensor 103 and A/D conversion circuit 104 is composed of a plural kinds (three kinds R, G and B) of single-color pixel groups. Note that in the present embodiment, a description is given taking the example of a case where one of the G pixels, taken as a pixel of interest, is a defective pixel (flicker defect).

The defective pixel detection circuit 105 receives an input of digitized image data from the A/D conversion circuit 104. It is assumed that the signal level of each pixel included in image data is represented by 8 bits. The defective pixel detection circuit 105 includes a zero insertion circuit 201, a first low-pass filter (LPF) circuit 202, a second LPF circuit 203, a third LPF circuit 204, and a fourth LPF circuit 205. The defective pixel detection circuit 105 also includes a first high-pass filter (HPF) circuit 206, a second HPF circuit 207, a third HPF circuit 208, and a fourth HPF circuit 209. The defective pixel detection circuit 105 further includes a first absolute (ABS) circuit 210, a second ABS circuit 211, a third ABS circuit 212, and a fourth ABS circuit 213. The defective pixel detection circuit 105 further includes a luminance signal generation circuit 214, a defect determination circuit 215, a threshold determination circuit (first determination unit) 216, a correlation determination circuit (second determination unit) 217, a multiplier 218, and a selector 219.

Figures 3A, 3B, 3C, 3D, 3E, 3F, 3G, 3H, 3I:
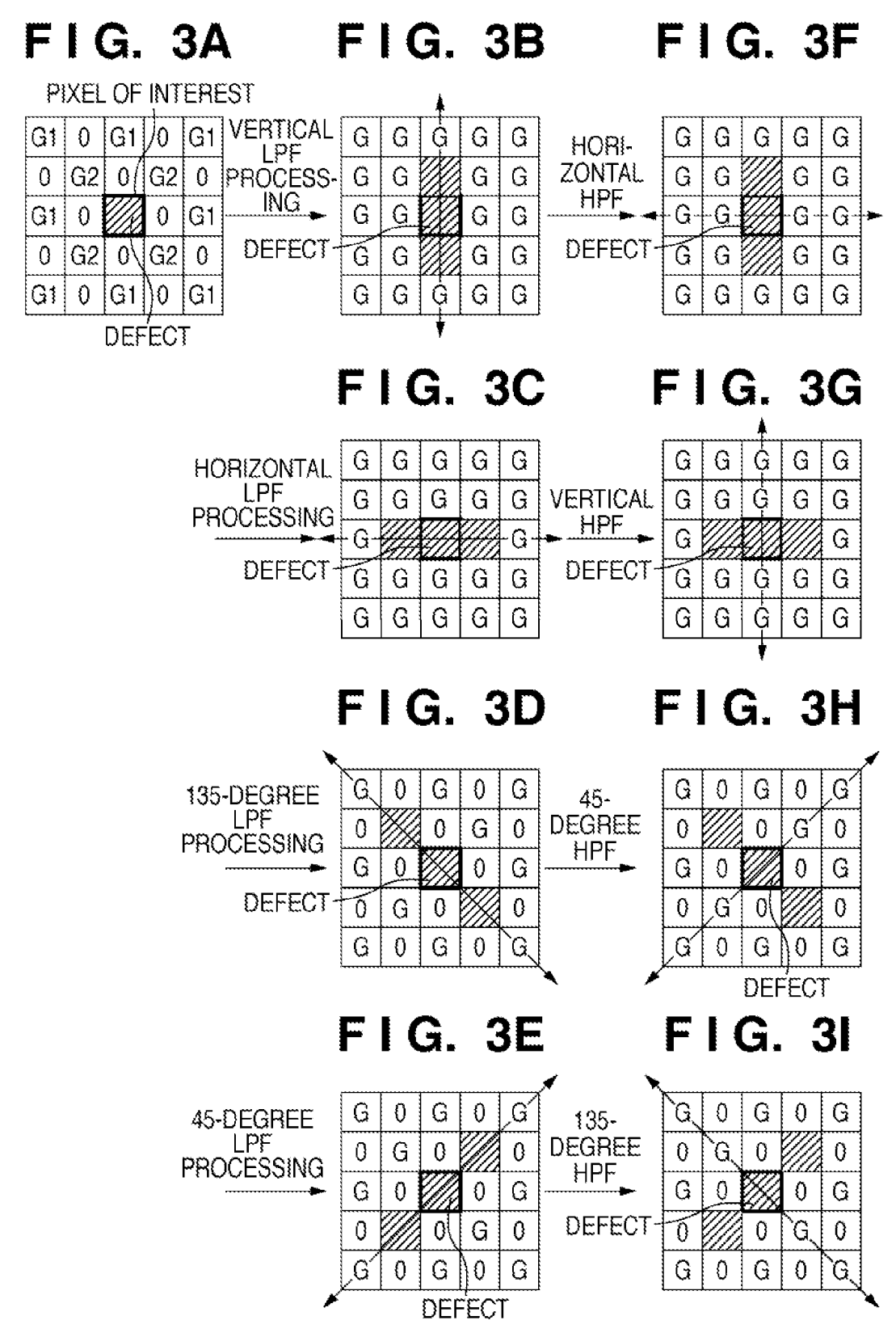

The zero insertion circuit 201, as shown in FIG. 3A, inserts a zero value (0) into the signal levels of pixels other than the G pixels (pixels having different colors from the pixel of interest) in a region constituted by a plurality of pixels centered on the pixel of interest.

The first LPF circuit 202, as shown in FIG. 3B, performs low-pass filter processing in the vertical direction ((low-pass filter processing using a filter coefficient of (1, 2, 1), for example) on the image data in which a zero value has been inserted in the signal levels of the pixels other than the G pixels. Through this, the signal levels of the pixels having a zero value are interpolated by the signal levels of their respective vertical pixels.

The second LPF circuit 203, as shown in FIG. 3C, performs LPF processing in the horizontal direction on the image data in which a zero value has been inserted in the signal levels of the pixels other than the G pixels. Through this, the signal levels of the pixels having a zero value are interpolated by the signal levels of their respective horizontal pixels.

The third LPF circuit 204, as shown in FIG. 3D, performs LPF processing in the 135 degree direction on the image data in which a zero value has been inserted in the signal levels of the pixels other than the G pixels. Through this, the signal levels of the pixels having a zero value are interpolated by the signal levels of their respective pixels located in the 135 degree direction.

The fourth LPF circuit 205, as shown in FIG. 3E, performs LPF processing in the 45 degree direction on the image data in which a zero value has been inserted in the signal levels of the pixels other than the G pixels. Through this, the signal levels of the pixels having a zero value are interpolated by the signal levels of their respective pixels located in the 45 degree direction.

The first HPF circuit 206, as shown in FIG. 3F, performs high-pass filter processing in the horizontal direction (high-pass filter processing using a filter coefficient of (−1, 2, −1), for example) on the result (output data) of the LPF processing performed by the first LPF circuit 202.

The second HPF circuit 207, as shown in FIG. 3G, performs HPF processing in the vertical direction on the result (output data) of the LPF processing performed by the second LPF circuit 203.

The third HPF circuit 208, as shown in FIG. 3H, performs HPF processing in the 45 degree direction on the result (output data) of the LPF processing performed by the third LPF circuit 204.

The fourth HPF circuit 209, as shown in FIG. 3I, performs HPF processing in the 135 degree direction on the result (output data) of the LPF processing performed by the fourth LPF circuit 205.

In this way, in the defective pixel detection circuit 105, the first LPF circuit 203 and the first HPF circuit 206 constitute a processing unit for performing filter processing in different directions, using the pixel of interest as a reference. Similarly, the second LPF circuit 203 and the second HPF circuit 207, the third LPF circuit 204 and the third HPF circuit 208, and the fourth LPF circuit 205 and the fourth HPF circuit 209 also respectively constitute processing units for performing filter processing. Note that the direction of the LPF processing (first direction) and the direction of the HPF processing (second direction orthogonal to the first direction) differ for each of the processing units.

The first ABS circuit 210 outputs an 8-bit absolute value of the result (output data) of the HPF processing performed by the first HPF circuit 206. Similarly, the second ABS circuit 211, the third ABS circuit 212, and the fourth ABS circuit 213 output 8-bit absolute values of the results (output data) of the HPF processing performed by the second HPF circuit 207, the third HPF circuit 208, and the fourth HPF circuit 209, respectively. The absolute values of the results of the HPF processing performed by the first to fourth HPF circuits 206 to 209 are referred to respectively as HA1, HA2, HA3, and HA4.

The luminance signal generation circuit 214 generates a luminance signal from the image data input into the defective pixel detection circuit 105 (image data composed of a Bayer array of R, G and B). For example, the luminance signal generation circuit 214 generates a luminance signal Y in accordance with Equation 1 below.

$$Y = 0.299R + 0.587G + 0.114B \quad \text{(Equation 1)}$$

The defect determination circuit 215 outputs a defect flag indicating whether or not the signal from the pixel of interest is a defective pixel signal, in accordance with the signs (plus or minus) of the results of the HPF processing performed by the first to fourth HPF circuits 206 to 209. The defect determination circuit 215 also outputs a black-and-white flag indicating whether the defective pixel is a white defect or a black defect. Here, "white defect" refers to a defective pixel that looks bright in darkness, and "black defect" refers to a defective pixel that looks dark under incident light.

Specifically, in the case where all the results of the HPF processing performed by the first to fourth HPF circuits 206 to 209 have the same sign, the defect determination circuit 215 outputs a flag "1" as the defect flag (1 bit). This indicates that the signal from the pixel of interest is a defective pixel signal. On the other hand, in the case where any of the results of the HPF processing performed by the first to fourth HPF circuits 206 to 209 has a different sign, the defect determination circuit 215 outputs a flag "0" as the defect flag. This indicates that the signal from the pixel of interest is not a defective pixel signal. Note that the defect flag is used as a selection signal in the selector 219.

In the case where all the results of the HPF processing performed by the first to fourth HPF circuits 206 to 209 have a plus sign, the defect determination circuit 215 outputs a flag "1" indicating a white defect, as the black-and-white flag (1 bit). On the other hand, in the case where all the results of the HPF processing performed by the first to fourth HPF circuits 206 to 209 have a minus sign, the defect determination circuit 215 outputs a flag "0" indicating a black defect, as the black-and-white flag. This black-and-white flag is not always necessary and may be omitted. Note that the black-and-white flag is output to the threshold determination circuit 216.

The threshold determination circuit 216 compares the absolute values HA1 to HA4 of the results of the HPF processing, which have been input respectively from the first to fourth ABS circuits 210 to 213, with an arbitrarily set threshold. Based on the comparison results, the threshold determination circuit 216 outputs a first determination value D1, which is a value indicating the possibility that the signal from the pixel of interest is a defective pixel signal.

Figure 4:
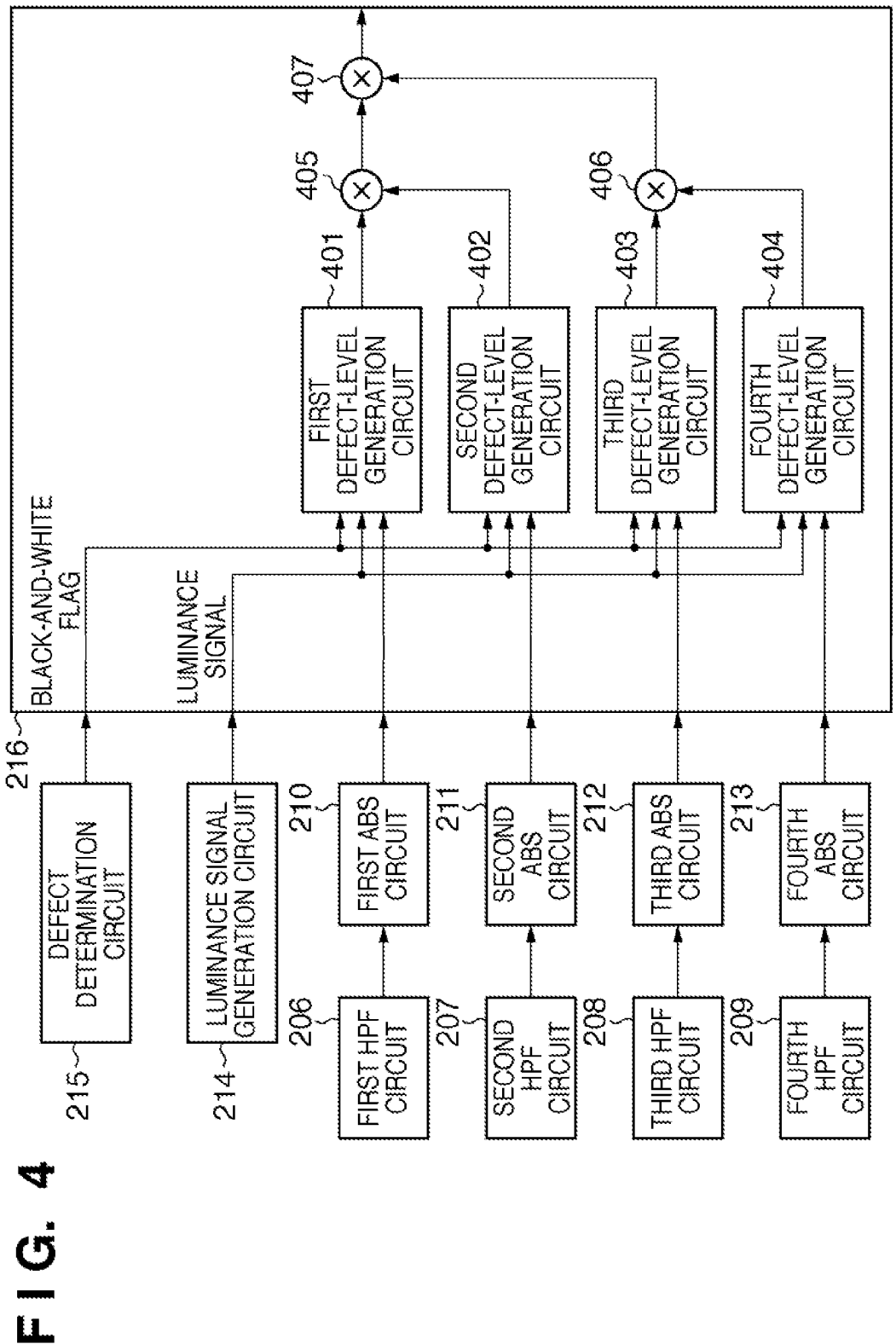
FIG. 4 is a schematic block diagram showing the configuration of a threshold determination circuit in the defective pixel detection circuit shown in FIG. 2.

FIG. 4 is a schematic block diagram showing the configuration of the threshold determination circuit 216. The threshold determination circuit 216 includes a first defect-level generation circuit 401, a second defect-level generation circuit 402, a third defect-level generation circuit 403, a fourth defect-level generation circuit 404, and multipliers 405 to 407.

The first defect-level generation circuit 401 generates (calculates) a defect level DL1 based on the absolute value HA1 of the result of the HPF processing (horizontal filter processing), which has been input from the first ABS circuit 210. The second defect-level generation circuit 402 generates a defect level DL2 based on the absolute value HA2 of the result of the HPF processing (vertical filter processing), which has been input from the second ABS circuit 211. The third defect-level generation circuit 403 generates a defect level DL3 based on the absolute value HA3 of the result of the HPF processing (45-degree filter processing), which has been input from the third ABS circuit 212. The fourth defect-level generation circuit 404 generates a defect level DL4 based on the absolute value HA4 of the result of the HPF processing (135-degree filter processing), which has been input from the fourth ABS circuit 213. It is assumed that these absolute values HA1 to HA4 of the results of the HPF processing are each represented by an 8-bit value.

Figure 5A:
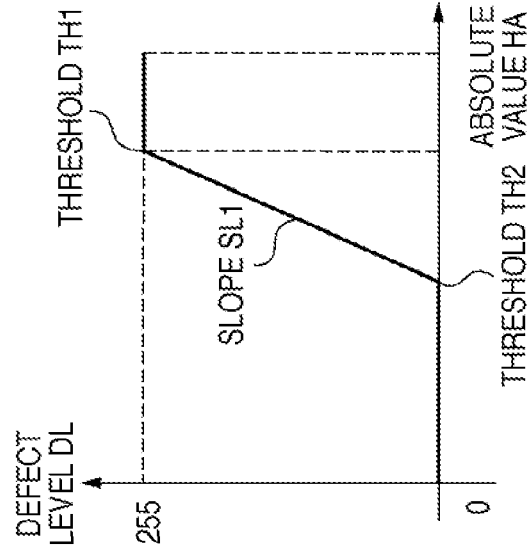
FIGS. 5A to 5B are diagrams illustrating the generation of a defect level performed by a defect-level generation circuit in the threshold determination circuit shown in FIG. 4.
Figure 5B:
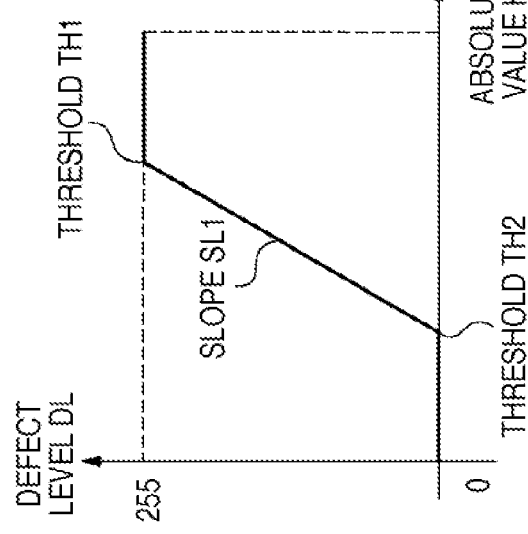

A concrete description is given of the generation of a defect level performed by the first to fourth defect-level generation circuits 401 to 404, with reference to FIGS. 5A and 5B. Note that the term "defect level" as used herein refers to a value indicating the possibility that the signal from the pixel of interest is a defective pixel signal. In the present embodiment, the defect level is generated as a value that ranges from 0 to 255, the defect level "0" indicating that the signal from the pixel of interest is not a defective pixel signal. On the contrary, the defect level "255" indicates that the signal from the pixel of interest is a defective pixel signal. The closer the defect level to "0", the higher the possibility that the signal from the pixel of interest is not a defective pixel signal, whereas the closer the defect level to "255", the higher the possibility that the signal from the pixel of interest is a defective pixel signal.

FIGS. 5A and 5B show the relationship between the absolute value of the result of HPF processing, which is input to the first to fourth defect-level generation circuits 401 to 404, and the defect level (value) generated by the first to fourth defect-level generation circuits 401 to 404. In FIGS. 5A and 5B, the horizontal axis indicates the absolute value HA (HA1 to HA4) as the result of HPF processing, and the vertical axis indicates the defect level DL (DL1 to DL4).

The first to fourth defect-level generation circuits 401 to 404 hold, in advance, a threshold TH2 shown in FIGS. 5A and 5B and a slope value SL1. The first to fourth defect-level generation circuits 401 to 404 convert the absolute value HA of the result of the HPF processing into the defect level DL (8 bits) in accordance with Equations 2 to 4 below.

In the case where HA≤TH2, $$DL=0. \quad \text{(Equation 2)}$$

In the case where TH2<HA<TH1, $$DL=SL1 \times (HA-TH2). \quad \text{(Equation 3)}$$

In the case where TH1≤HA, $$DL=255. \quad \text{(Equation 4)}$$

Here, TH1=TH2+(255/SL1).

For example, in the examples shown in FIGS. 5A and 5B, if the input absolute value HA of the result of the HPF processing is greater than or equal to a threshold, the first to fourth defect-level generation circuits 401 to 404 generate the defect level DL of "255". On the other hand, if the input absolute value HA of the result of the HPF processing is less than or equal to the threshold TH2, the first to fourth defect-level generation circuits 401 to 404 generate the defect level DL of "0". If the input absolute value HA of the result of the HPF processing is greater than the threshold TH2 and smaller than the threshold TH1, the first to fourth defect-level generation circuits 401 to 404 generate the defect level DL of a value that increases as the input absolute value of the result of the HPF processing increases.

Note that the first to fourth defect-level generation circuits 401 to 404 change the threshold TH1 and the slope SL1 in accordance with the black-and-white flag input from the defect determination circuit 215, that is, depending on whether the defective pixel is a white defect or a black defect. For example, when the defective pixel is a white defect, the first to fourth defect-level generation circuits 401 to 404 set the threshold TH2 and the slope SL1 to have the characteristic as shown in FIG. 5A, whereas when the defective pixel is a black defect, the first to fourth defect-level generation circuits 401 to 404 set the threshold TH2 and the slope SL1 to have the characteristic as shown in FIG. 5B.

It is assumed that the threshold TH2 is a value that is obtained by multiplying an arbitrarily set value, which is determined by the operating mode of the imaging apparatus 100, for example, and an average value of the luminance signals from the neighboring pixels of the pixel of interest generated by the luminance signal generation circuit 214. The threshold TH2 needs to be changed in accordance with the luminance signals generated by the luminance signal generation circuit 214 (that is, the amount of noise), since the higher the luminance, the greater the noise. By increasing the threshold TH2 as the luminance increases, it is possible to prevent noise from being misjudged as a defective pixel. It is also assumed that the slope SL1 is also a value that is obtained by multiplying an arbitrary set value, which is determined by the operating mode of the imaging apparatus 100, for example, and the luminance signals generated by the luminance signal generation circuit 214. The threshold TH1 is determined by determining the threshold TH2 and the slope SL1. Note that the defect level DL relative to the absolute value HA as shown in FIGS. 5A and 5B may be pre-stored in a table, instead of being obtained by conversion using Equations 2 to 4.

Alternatively, instead of setting the thresholds TH1 and TH2, the relationship between the absolute value HA and the defect level DL may be defined as a function (such as a cubic function) in which the defect level DL increases as the absolute value HA increases, over the entire range of the absolute value HA. Then, this function may be switched in accordance with the luminance, so that the value of the defect level DL relative to the absolute value HA decreases as the luminance in the neighborhood of the pixel of interest increases.

The multiplier 405 obtains a 16-bit value by multiplying the defect level generated by the first defect-level generation circuit 401 and the defect level generated by the second defect-level generation circuit 402, performs an 8-bit shift operation on the 16-bit value, and outputs the resultant 8-bit value as a defect level DL5. The multiplier 406 obtains a 16-bit value by multiplying the defect level generated by the third defect-level generation circuit 403 and the defect level generated by the fourth defect-level generation circuit 404, performs an 8-bit shift operation on the 16-bit value, and outputs the resultant 8-bit value as a defect level DL6. The multiplier 407 obtains a 16-bit value by multiplying the defect level DL5 obtained by the multiplication by the multiplier 405 and the defect level DL6 obtained by the multiplication by the multiplier 406, performs an 8-bit shift operation on the 16-bit value, and outputs the resultant 8-bit value as a first determination value D1.

In this way, the threshold determination circuit 216 obtains, based on the results of filter processing, a difference in signal level between the pixel of interest and a plurality of pixels located in the neighborhood of the pixel of interest. The threshold determination circuit 216 then generates the first determination value D1 indicating that the higher the difference, the higher is the possibility that the signal from the pixel of interest is a defective pixel signal.

Referring back to FIG. 2, the correlation determination circuit 217 compares the magnitudes of the absolute values HA1 to HA4 of the results of the HPF processing, which have been input respectively from the first to fourth ABS circuits 210 to 213. Based on the comparison result, the correlation determination circuit 217 outputs a second determination value D2 indicating the possibility that the signal from the pixel of interest is a defective pixel signal.

FIG. 6 is a schematic block diagram showing the configuration of the correlation determination circuit 217. The correlation determination circuit 217 includes a first selection circuit 601, a second selection circuit 602, a third selection circuit 603, a fourth selection circuit 604, a fifth selection circuit 605, a sixth selection circuit 606, a subtracter 607, and a defect-level determination circuit 608.

The first selection circuit 601 compares the absolute value HA1 of the result of the HPF processing, which has been input from the first ABS circuit 210, and the absolute value HA2 of the result of the HPF processing, which has been input from the second ABS circuit 211, and outputs the larger absolute value. The second selection circuit 602 compares the absolute value HA1 of the result of the HPF processing, which has been input from the first ABS circuit 210, and the absolute value HA2 of the result of the HPF processing, which has been input from the second ABS circuit 211, and outputs the smaller absolute value.

The third selection circuit 603 compares the absolute value HA3 of the result of the HPF processing, which has been input from the third ABS circuit 212, and the absolute value HA4 of the result of the HPF processing, which has been input from the fourth ABS circuit 213, and outputs the larger absolute value. The fourth selection circuit 604 compares the absolute value HA3 of the result of the HPF processing, which has been input from the third ABS circuit 212, and the absolute value HA4 of the result of the HPF processing, which has been input from the fourth ABS circuit 413, and outputs the smaller absolute value.

The fifth selection circuit 605 compares the absolute value output from the first selection circuit 601 and the absolute value output from the third selection circuit 603, and outputs the larger absolute value. The absolute value output from the fifth selection circuit 605 is a maximum absolute value among the results of the HPF processing performed by the first to fourth ABS circuits 210 to 213 (that is, among the results of the filter processing performed in four directions).

The sixth selection circuit 606 compares the absolute value output from the second selection circuit 602 and the absolute value output from the fourth selection circuit 604, and outputs the smaller absolute value. The absolute value output from the sixth selection circuit 606 is a minimum absolute value among the results of the HPF processing performed by the first to fourth ABS circuits 210 to 213 (that is, among the results of the filter processing performed in four directions).

The subtracter 607 subtracts the absolute value output from the sixth selection circuit 606 from the absolute value output from the fifth selection circuit 605. The result of the subtraction performed by the subtracter 607 indicates a maximum difference (the width of distribution of the difference) among the results of the HPF processing performed by the first to fourth ABS circuits 210 to 213, and will always be a positive value greater than or equal to zero because it is obtained by subtracting the minimum absolute value from the maximum absolute value.

Figure 7:
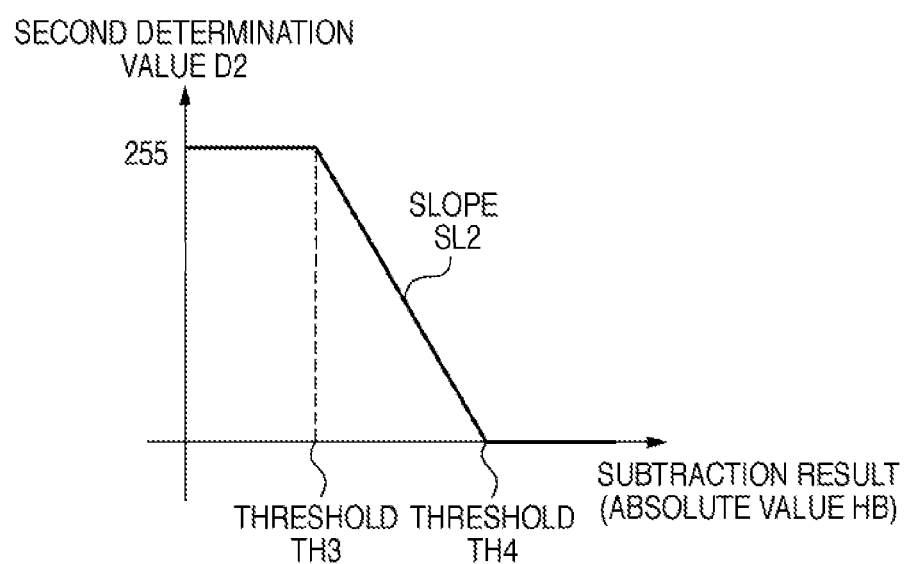
FIG. 7 is a diagram illustrating the generation of a second determination value performed by the defect-level generation circuit in the correlation determination circuit shown in FIG. 6.

The defect-level determination circuit 608 generates (calculates) the second determination value D2 based on the absolute value output from the subtractor 607, and outputs the second determination value D2. A specific description is given of the generation of the second determination value D2 performed by the defect-level determination circuit 608, with reference to FIG. 7. Note that, like the first determination value D1, the second determination value D2 generated by the defect-level determination circuit 608 indicates the possibility of the signal from the pixel of interest being a defective pixel signal. FIG. 7 is a diagram showing the relationship between the result of the subtraction performed by the subtractor 607 (absolute value HB), which is to be input to the defect-level determination circuit 608, and the second determination value D2 generated by the defect-level determination circuit 608. In FIG. 7, the horizontal axis indicates the result of the subtraction performed by the subtractor 607 (absolute value HB), and the vertical axis indicates the second determination value D2.

The defect-level determination circuit 608 holds, in advance, a threshold TH3 and a slope value SL2 shown in FIG. 7, and converts the result of the subtraction by the subtractor 607 into the second determination value D2 (8 bits) in accordance with Equations 5 to 7 below.

In the case where HB≤TH3, $$D2=255. \quad \text{(Equation 5)}$$

In the case where TH3<HB<TH4, $$D2=SL2\times(HB-TH3)+255. \quad \text{(Equation 6)}$$

In the case where TH4≤HB, $$D2=0. \quad \text{(Equation 7)}$$

Here, TH4=TH3−(255/SL2).

For example, in the example shown in FIG. 7, if the result HB of the subtraction by the subtracter 607 is less than or equal to the threshold TH3, the defect-level determination circuit 608 generates the second determination value D2 of "255". On the other hand, if the result HB of the subtraction by the subtractor 607 is greater than or equal to the threshold TH4, the defect-level determination circuit 608 generates the second determination value D2 of "0". If the result HB of the subtraction by the subtracter 607 is greater than the threshold TH3 and smaller than the threshold TH4, the defect-level determination circuit 608 generates the second determination value D2 of a value that increases as the result of the subtraction by the subtracter 607 (absolute value) decreases.

Note that the threshold TH3 is a value obtained by multiplying an arbitrarily set value, which is determined by the operating mode of the imaging apparatus 100, for example, and the luminance signal generated by the luminance signal generation circuit 214. It is also noted that the slope SL2 is also a value obtained by multiplying an arbitrarily set value, which is determined by the operating mode of the imaging apparatus 100, for example, and the luminance signal generated by the luminance signal generation circuit 214. The threshold TH4 is determined by determining the threshold TH3 and the slope value SL2. Alternatively, the second determination value D2 relative to the result HB of the subtraction by the subtractor 607 shown in FIG. 7 may be pre-stored in a table, instead of being obtained by conversion using Equations 5 to 7.

In this way, the correlation determination circuit 217 obtains, based on the results of filter processing, the width of distribution of the difference in signal level between the pixel of interest and neighboring pixels of the pixel of interest (that is, the subtraction result HB). The correlation determination circuit 217 then generates the second determination value D2 indicating that the smaller the above width of distribution of the difference, the greater is the possibility that the signal from the pixel of interest is a defective pixel signal.

Note that in the case where much noise is included in image data, there is the possibility that the threshold determination circuit 216 may misjudge the signal from the pixel of interest as a defective pixel signal (that is, output the first determination value of "255") due to the noise. In view of this, it is necessary in the correlation determination circuit 217 to determine the signal from the pixel of interest not to be a defective pixel signal, in the case where much noise is included in image data of a region including the pixel of interest and also the width of distribution of the different is large.

In the case where the pixel of interest is not a defective pixel, the results of the HPF processing obtained through the first to fourth ABS circuits 210 to 213 (that is, the results of the filter processing performed in four directions) will be a value close to zero, and accordingly, the width of distribution of the differences will also be a value close to zero. In such a case, the correlation determination circuit 217 may misjudge the signal from the pixel of interest as a defective pixel signal (that is, output the second determination value of "255") because the width of distribution of the differences is small. For this reason, it is necessary in the threshold determination circuit 216 to determine the signal from the pixel of interest to be a defective pixel signal, in the case where the difference in signal level between the pixel of interest and adjacent pixels is greater than or equal to a threshold.

In view of this, in the present embodiment, as shown in FIG. 2, the multiplier 218 obtains a third determination value by multiplying the first determination value D1 output from the threshold determination circuit 216 and the second determination value D2 output from the correlation determination circuit 217. Specifically, the multiplier 218 obtains a 16-bit value by multiplying the first determination value D1 and the second determination value D2, performs an 8-bit shift operation on the 16-bit value, and outputs the resultant 8-bit value (that is, the value from 0 to 255) as a third determination value K. This enables the correlation determination circuit 217 to properly determine whether or not the pixel of interest is a defective pixel, even if the threshold determination circuit 216 made a misjudgment, and enables the threshold determination circuit 216 to properly determine whether or not the pixel of interest is a defective pixel, even if the correlation determination circuit 217 made a misjudgment. In other words, in both the threshold determination circuit 216 and the correlation determination circuit 217, if the pixel of interest has been determined as a defective pixel, the pixel of interest is detected as a defective pixel. Alternatively, in both the threshold determination circuit 216 and the correlation determination circuit 217, if it has been determined that there is a high possibility that the pixel of interest is a defective pixel, the signal from the pixel of interest is detected as a signal that is highly possibly a defective pixel signal.

The selector 219 outputs the third determination value K obtained by the multiplication by the multiplier 218, if the defect flag input from the defect determination circuit 215 is "1" (that is, indicates that the pixel of interest is a defective pixel). If the defect flag input from the defect determination circuit 215 is "0" (that is, indicates that the pixel of interest is not a defective pixel), the selector 219 outputs "0" as the third determination value. Note that the defect level output from the selector 219 is input into the defective pixel correction circuit 106.

Figure 8:
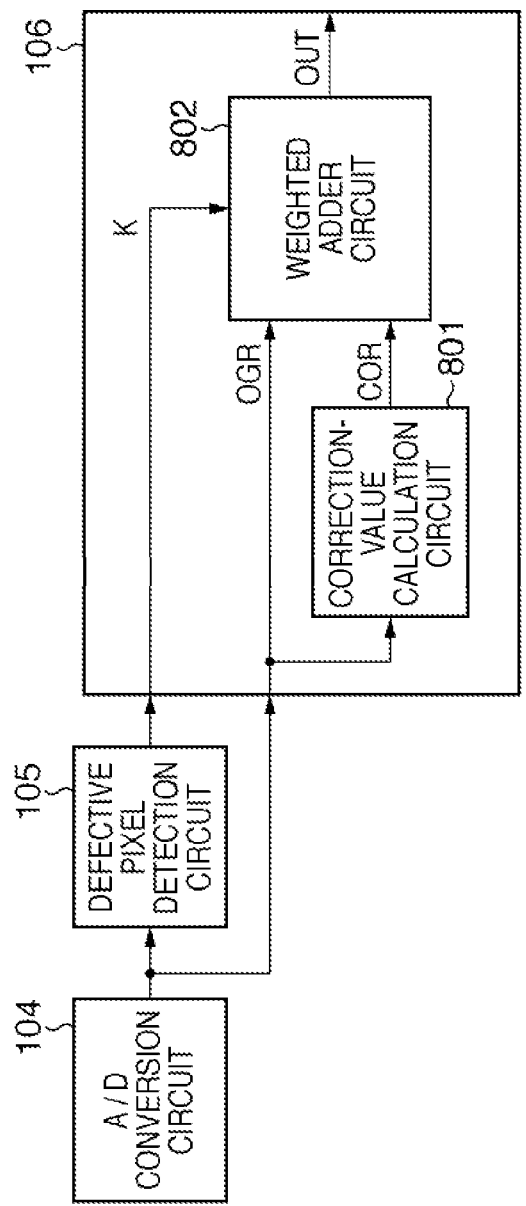
FIG. 8 is a schematic block diagram showing a configuration of the defective pixel correction circuit in the imaging apparatus shown in FIG. 1.

FIG. 8 is a schematic block diagram showing the configuration of the defective pixel correction circuit 106. The defective pixel correction circuit 106 receives an input of image data including a defective pixel, via the A/D conversion circuit 104. The defective pixel correction circuit 106 includes a correction value calculation circuit 801 and a weighted adder circuit 802.

The correction value calculation circuit 801 performs, for example, filter processing using a factor (e.g., (1, 0, 1)) that does not reference the pixel of interest, and calculates a correction value for correcting the signal level of a defective pixel. Alternatively, the correction value calculation circuit 801 may determine an edge direction from the image data and calculate a correction value with reference to the signal levels of pixels located along the edge direction of the pixel of interest, or may obtain a correction value through preliminary interpolation. As another alternative, a correction value may be obtained by assigning a higher weight to a correction value calculated from the signal levels of pixels located along the edge direction than the weight of a correction value calculated from the signal levels of pixels located along the other directions, and adding and averaging those correction values.

The weighted adder circuit 802 weights and adds a signal level ORG of the pixel of interest output from the A/D conversion circuit 104 and a correction value COR calculated by the correction value calculation circuit 801 in accordance with the third determination value K output from the defective pixel detection circuit 105. For example, the weighted adder circuit 802 outputs a corrected signal level OUT of the pixel of interest in accordance with Equation 8 below.

$$OUT=COR \times K+ORG \times (255-K) \quad \text{(Equation 8)}$$

As mentioned above, the third determination value K ranges from 0 to 255. Since the third determination value K is close to "0" in the case where there is a high possibility that the pixel of interest is not a defective pixel (that is, the pixel of interest is a normal pixel), the weighted adder circuit 802 outputs the signal level (that is, image data in which a defective pixel has been corrected) OUT by assigning a high weight to the signal level ORG of the pixel of interest and adding the weighted signal level ORG and the correction value COR. On the other hand, since the third determination value K is close to "255" in the case where there is a high possibility that the pixel of interest is a defective pixel, the weighted adder circuit 802 outputs the signal level OUT by assigning a high weight to the correction value COR and adding the weighted correction value COR and the signal level ORG of the pixel of interest. Alternatively, the third determination value K may be compared with a predetermined threshold, and if the third determination value K is smaller than the threshold, outputs the signal level ORG of the pixel of interest as the corrected signal level OUT, and otherwise outputs a value obtained in accordance with Equation 8 as the corrected signal level OUT.

According to the present embodiment as described above, in both the threshold determination circuit 216 and the correlation determination circuit 217, the pixel of interest is detected as a defective pixel in the case where the signal from a pixel of interest has been determined as a defective pixel signal. Alternatively, in both the threshold determination circuit 216 and the correlation determination circuit 217, in the case where it has been determined that there is a high possibility that the signal from the pixel of interest is a defective pixel signal, the signal level of the pixel of interest is detected as the signal level that is highly possibly a defective pixel signal. For this reason, a defective pixel can be detected more precisely than with the conventional techniques. Furthermore, a defective pixel can be corrected more precisely than with the conventional techniques because the signal level of the pixel of interest is corrected in accordance with a value obtained by multiplying the defect level output from the threshold determination circuit 216 and the defect level output from the correlation determination circuit 217.

Figure 9:
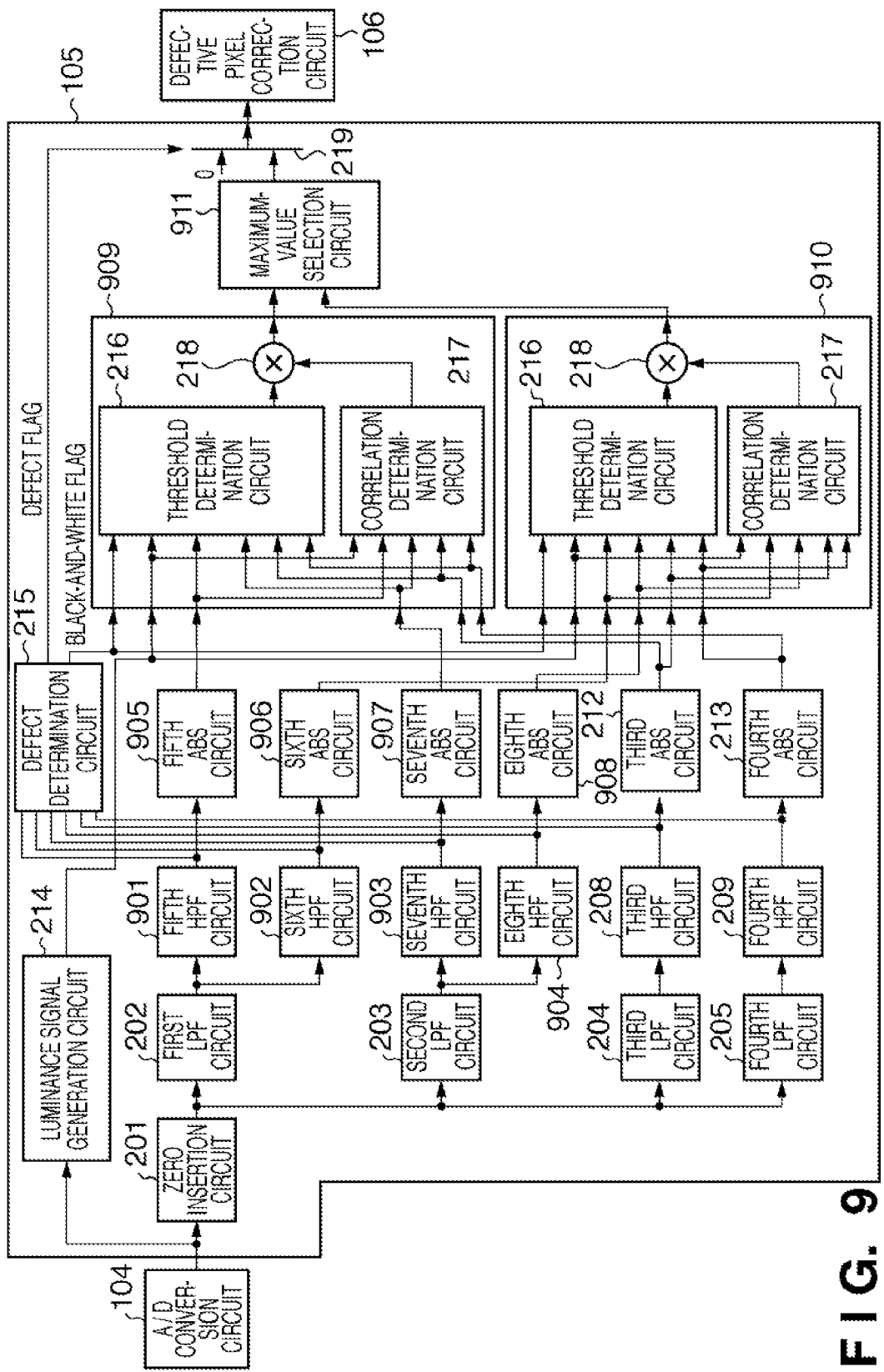
FIG. 9 is a schematic block diagram showing another configuration of the defective pixel detection circuit in the imaging apparatus shown in FIG. 1.

Note that in the defective pixel detection circuit 105, as shown in FIG. 9, the first LPF circuit 202 and the second LPF circuit 203 each may be provided with two high-pass filter circuits each performing different high-pass filter processing.

Figure 10A:
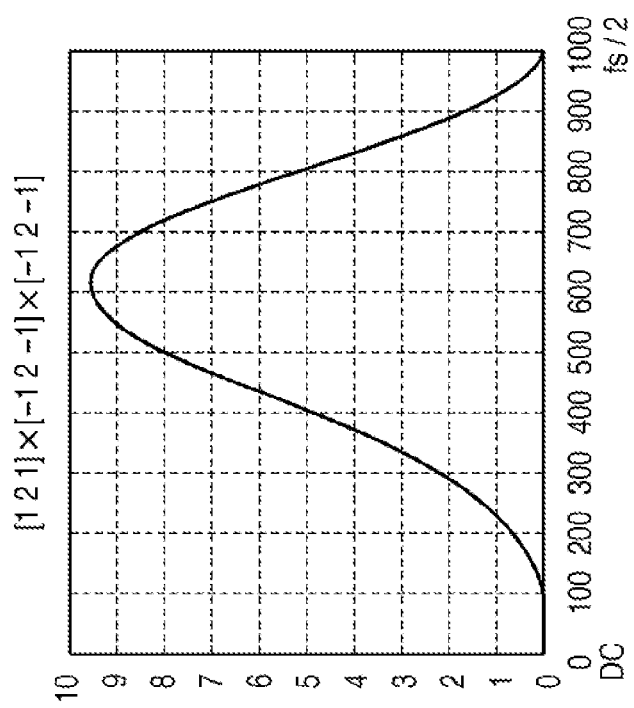
FIGS. 10A and 10B are diagrams illustrating HPF processing performed by a fifth HPF circuit and a sixth HPF circuit in the defective pixel detection circuit shown in FIG. 9.
Figure 10B:
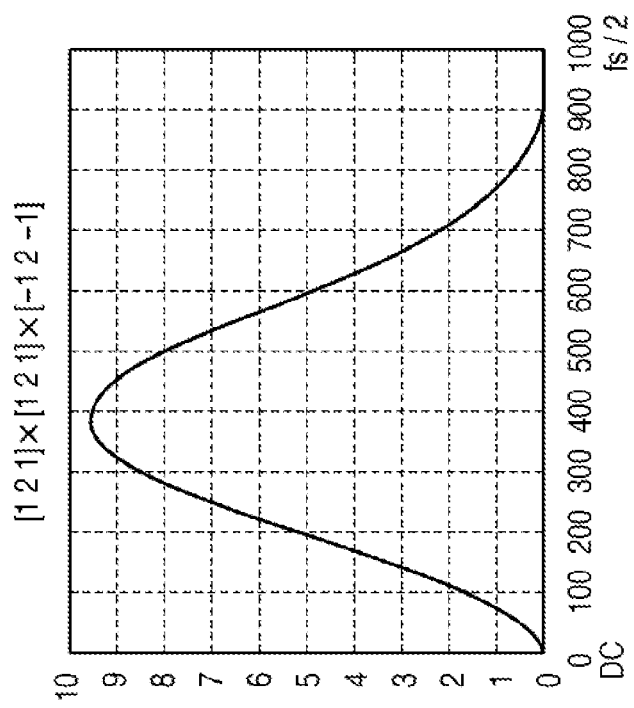

Referring to FIG. 9, a fifth HPF circuit 901 and a sixth HPF circuit 902 each perform different high-pass filter processing in the horizontal direction on the result of the LPF processing performed by the first LPF circuit 202. For example, as shown in FIG. 10A, the fifth HPF circuit 901 performs high-pass filter processing using a low-pass filter coefficient ((1, 2, 1)×(1, 2, 1)×(−1, 2, −1)) (first high-pass filter processing using a first high-pass filter). The sixth HPF circuit 902, as shown in FIG. 10B, performs high-pass filter processing using a high-pass filter coefficient ((1, 2, 1)×(−1, 2, −1)×(−1, 2, −1)) (second high-pass filter processing using a second high-pass filter).

A seventh HPF circuit 903 and an eighth HPF circuit 904 each perform different high-pass filter processing in the vertical direction on the result of the LPF processing performed by the second LPF circuit 203. For example, the seventh HPF circuit 903 performs high-pass filter processing using a low-pass filter coefficient (see FIG. 10A). The eighth HPF circuit 904 performs high-pass filter processing using a high-pass filter coefficient (see FIG. 10B).

A fifth ABS circuit 905 outputs an absolute value of the result (output data) of the HPF processing performed by the fifth HPF circuit 901. Similarly, a sixth ABS circuit 906, a seventh ABS circuit 907, and an eighth ABS circuit 908 output absolute values of the results (output data) of the HPF processing performed respectively by the sixth HPF circuit 902, the seventh HPF circuit 903, and the eighth HPF circuit 904.

A first arithmetic circuit 909 and a second arithmetic circuit 910 have the same configuration, each including the threshold determination circuit 216, the correlation determination circuit 217, and the multiplier 218. The first arithmetic circuit 909 receives an input of the absolute values of the results of the HPF processing obtained through the fifth ABS circuit 905, the seventh ABS circuit 907, the third ABS circuit 212, and the fourth ABS circuit 213. The second arithmetic circuit 910 receives an input of the absolute values of the results of the HPF processing obtained through the sixth ABS circuit 906, the eighth ABS circuit 908, the third ABS circuit 212, and the fourth ABS circuit 213.

The first arithmetic circuit 909 and the second arithmetic circuit 910 each obtain a determination value indicating the possibility that the signal of a pixel of interest is a defective pixel signal, using the absolute values of the results of the HPF processing performed in the same band. Note that it is ideal to use the same band for all directions including the horizontal direction, the vertical direction, the 45-degree direction, and the 135-degree direction. In the present embodiment, different filter coefficients are used between the horizontal and vertical directions and the 45- and 135-degree directions (oblique directions) because the distance from the pixel of interest to a reference pixel differs between the oblique directions and the horizontal and vertical directions and therefore the frequency band is different therebetween.

A maximum-value selection circuit 911 compares the determination value output from the first arithmetic circuit 909 and the determination value output from the second arithmetic circuit 910, and outputs the larger determination value.

If filter processing is performed in high frequency bands on image data (see FIG. 10B), there are cases where the edge remains and accordingly the signal from the pixel of interest is misjudged as a defective pixel signal. For this reason, filter processing is performed also in low frequency bands so as to reliably detect a defective pixel existing in the low frequency bands. Then, for such a defective pixel that exists on the edge, the result of the high-pass filter processing and the result of the low-pass filter processing are compared in order to prevent the edge from being misjudged as a defective pixel.

In the present embodiment, although the case where a defective pixel occurs among the G pixels has been described as an example, even if a defective pixel occurs among the R or B pixels, it is possible to detect the defective pixel through similar processing by inserting a zero value into pixels other than the R or B pixels.

The threshold determination circuit 216 and the correlation determination circuit 217 may obtain the first and second determination values using the luminance signal Y obtained from Equation 1, instead of obtaining the first and second determination values by distinguishing among the G, R and B pixels.

The absolute value HA used by the threshold determination circuit 216 to obtain the first determination value D1 may be obtained by some other method, as long as it indicates the magnitude of the difference in signal level between the pixel of interest and a plurality of pixels in the neighborhood of the pixel of interest. For example, the threshold determination circuit 216 may obtain an average value of the absolute values of the results of the HPF processing performed by the first to fourth ABS circuits 210 to 213, and obtain the first determination value D1 from Equations 2 to 4, using the average value as the absolute value HA.

Also, the correlation determination circuit 217 may obtain the dispersion of the absolute values of the results of the HPF processing performed by the first to fourth ABS circuits 210 to 213, and set the second determination value D2 to a greater value as the value of this dispersion decreases.

Figure 11:
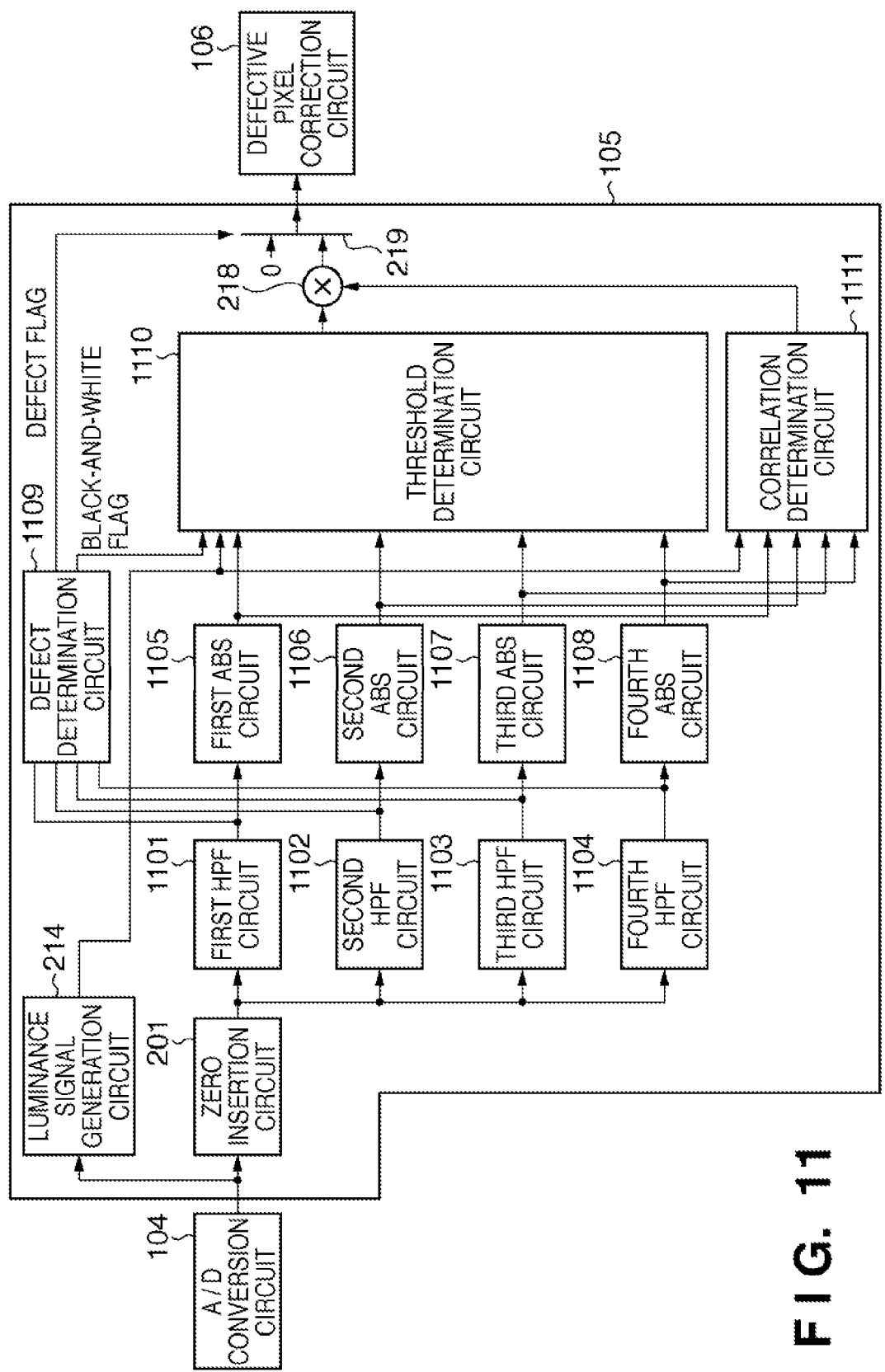
FIG. 11 is a schematic block diagram showing still another configuration of the defective pixel detection circuit in the imaging apparatus shown in FIG. 1.

Note that although the defective pixel detection circuit 105 is configured by the LPF circuits and the HPF circuits in FIG. 2, a configuration is also possible in which no LPF circuit is included, as shown in FIG. 11. Following is a description of another configuration of the defective pixel detection circuit 105 shown in FIG. 11, focusing on differences from the configuration of the defective pixel detection circuit 105 shown in FIG. 2.

A first HPF circuit 1101 performs HPF processing using a filter coefficient of, for example, (−1, 0, 2, 0, −1) in the horizontal direction on image data in which a zero value has been inserted in the signal levels of pixels other than the G pixels. Similarly, the first HPF circuit 1101 also performs HPF processing on image data in which a zero value has been inserted in the signal levels of pixels other than the R pixels, and on image data in which a zero value has been inserted in the signal levels of pixels other than the B pixels.

The second HPF circuit 1102 performs HPF processing using a filter coefficient of, for example, (−1, 0, 2, 0, −1) in the vertical direction on image data in which a zero value has been inserted in the signal levels of the pixels other than the G pixels. Similarly, the second HPF circuit 1102 also performs HPF processing on image data in which a zero value has been inserted in the signal levels of the pixels other than the R pixels, and on image data in which a zero value has been inserted in the signal levels of the pixels other than the B pixels.

The third HPF circuit 1103 performs HPF processing using a filter coefficient of, for example, (−1, 2, −1) in the 45-degree direction on image data in which a zero value has been inserted in the signal levels of the pixels other than the G pixels.

The fourth HPF circuit 1104 performs HPF processing using a filter coefficient of, for example, (−1, 2, −1) in the 135-degree direction on image data in which a zero value has been inserted in the signal levels of the pixels other than the G pixels.

With the configuration of the defective pixel detection circuit 105 shown in FIG. 11, the zero insertion circuit 201 does not perform interpolation processing on the pixels in which a zero value has been inserted, and therefore the HPF circuits each have a filter coefficient that is not affected by the pixels in which a zero value has been inserted during the HPF processing. In both the horizontal direction and the vertical direction, the same filter coefficient can be used for the G, R and B pixels because all the G, R and B pixels are arranged every other pixel. On the other hand, in both the 45-degree direction and the 135-degree direction, only the G pixels are targeted for HPF processing because the G pixels are arranged consecutively, whereas both the R and B pixels are arranged every other pixel.

First to fourth ABS circuits 1105 to 1108 output the absolute values (output data) of the results of the HPF processing performed respectively by the first to fourth HPF circuits 1101 to 1104.

Like the defect determination circuit 215 shown in FIG. 2, a defect determination circuit 1109 outputs a defect flag and a black-and-white flag in accordance with the signs (positive or negative) of the results of the HPF processing performed by the first to fourth HPF circuits 1101 to 1104. If the pixel of interest is a G pixel, the defect determination circuit 1109 references the signs of the results of the HPF processing performed by the first HPF circuit 1101, the second HPF circuit 1102, the third HPF circuit 1103, and the fourth HPF circuit 1104. If the pixel of interest is either an R or B pixel, the defect determination circuit 1109 references the signs of the results of the HPF processing performed by the first HPF circuit 1101 and the second HPF circuit 1102.

Like the threshold determination circuit 216 shown in FIG. 2, a threshold determination circuit 1110 compares the absolute values of the results of the HPF processing, which have been input from the first to fourth ABS circuits 1105 to 1108, with an arbitrarily set threshold. Based on the comparison results, the threshold determination circuit 1110 obtains the first determination value D1 indicating the possibility that the signal from the pixel of interest is a defective pixel signal. Like the correlation determination circuit 217 shown in FIG. 2, a correlation determination circuit 1111 compares the magnitudes of the absolute values of the results of the HPF processing, which have been input from the first to fourth ABS circuits 1105 to 1108. Based on the comparison results, the correlation determination circuit 1111 obtains the second determination value D2 indicating the possibility that the signal from the pixel of interest is a defective pixel signal.

If the pixel of interest is a G pixel, the threshold determination circuit 1110 and the correlation determination circuit 1111 reference the absolute values of the results of the HPF processing obtained through the first ABS circuit 1105, the second ABS circuit 1106, the third ABS circuit 1107, and the fourth ABS circuit 1108. If the pixel of interest is either an R or B pixel, the threshold determination circuit 1110 and the correlation determination circuit 1111 reference the absolute values of the results of the HPF processing obtained through the first ABS circuit 1105 and the second ABS circuit 1106.

Then, as in the case with FIG. 2, the multiplier 218 obtains the third determination value by multiplying the first determination value and the second determination value, and the third determination value is input into the defective pixel correction circuit 106 via the selector 219.

Figure 12:
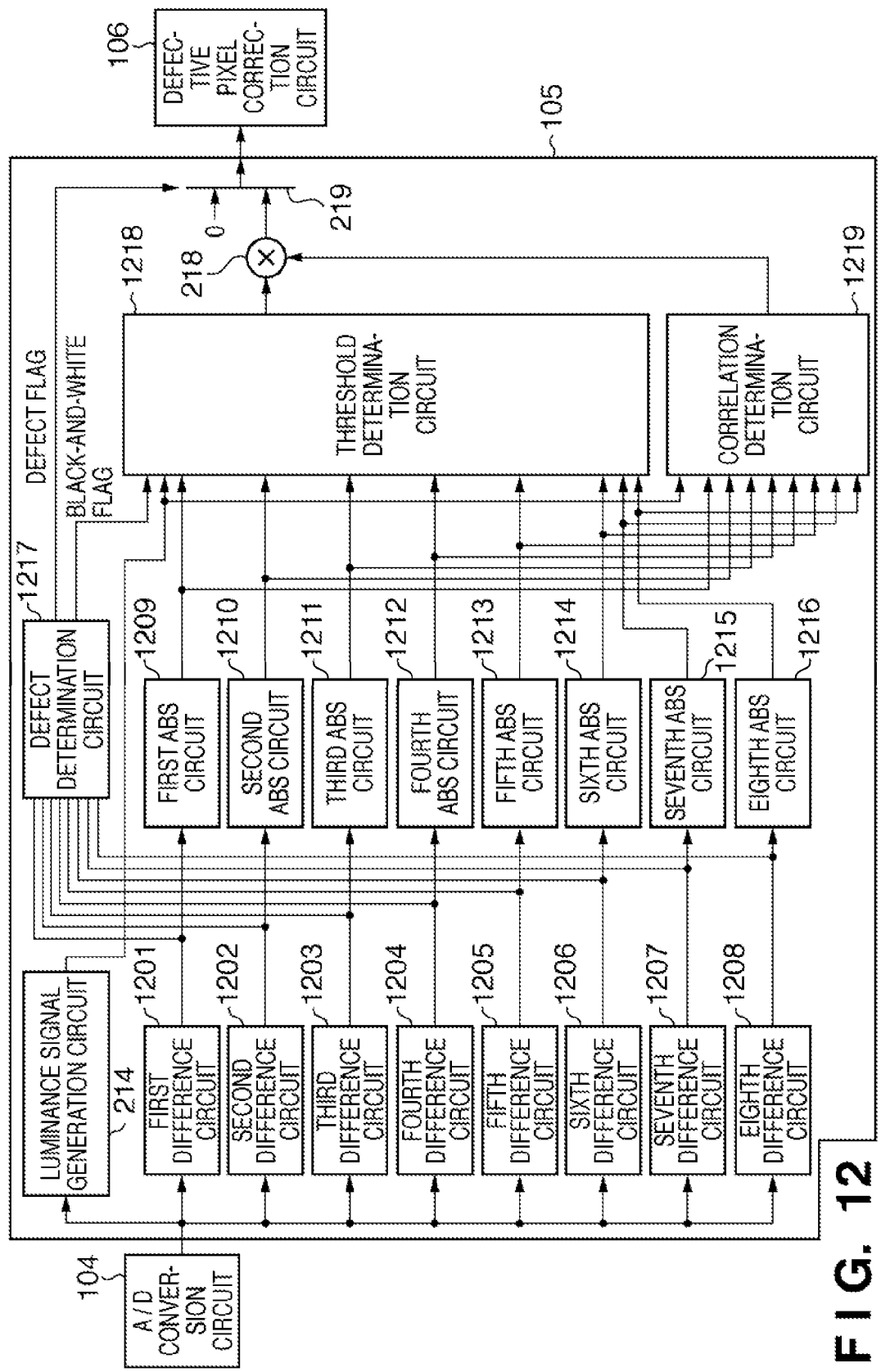
FIG. 12 is a schematic block diagram showing still another configuration of the defective pixel detection circuit in the imaging apparatus shown in FIG. 1.

Furthermore, a configuration is also possible in which the defective pixel detection circuit 105 is configured by difference circuits, as shown in FIG. 12, instead of the filter circuits such as LPF circuits and HPF circuits shown in FIG. 2. Following is a description of the configuration of the defective pixel detection circuit 105 shown in FIG. 12, focusing on differences from the configuration of the defective pixel detection circuit 105 shown in FIG. 2.

A first difference circuit 1201 performs difference processing for obtaining a value by subtracting, from the value of the pixel of interest, the value of the second pixel located on the right side of the pixel of interest and having the same color as the pixel of interest. A second difference circuit 1202 performs difference processing for obtaining a value by subtracting, from the value of the pixel of interest, the value of the second pixel located on the left side of the pixel of interest and having the same color as the pixel of interest.

A third difference circuit 1203 performs difference processing for obtaining a value by subtracting, from the value of the pixel of interest, the value of the second pixel located on the upper side of the pixel of interest and having the same color as the pixel of interest. A fourth difference circuit 1204 performs difference processing for obtaining a value by subtracting, from the value of the pixel of interest, the value of the second pixel located on the lower side of the pixel of interest and having the same color as the pixel of interest.

A fifth difference circuit 1205 performs difference processing for obtaining a value by subtracting, from the value of the pixel of interest, the value of the adjacent pixel located on the upper right side of the pixel of interest and having the same color as the pixel of interest. A sixth difference circuit 1206 performs difference processing for obtaining a value by subtracting, from the value of the pixel of interest, the value of the adjacent pixel located on the lower left side of the pixel of interest and having the same color as the pixel of interest.

A seventh difference circuit 1207 performs difference processing for obtaining a value by subtracting, from the value of the pixel of interest, the value of the adjacent pixel located on the upper left side of the pixel of interest and having the same color as the pixel of interest. An eighth difference circuit 1208 performs difference processing for obtaining a value by subtracting, from the value of the pixel of interest, the value of the adjacent pixel located on the lower right side of the pixel of interest and having the same color as the pixel of interest.

In this way, the first to eighth difference circuits 1201 to 1208 each obtain a difference in value between the pixel of interest and a pixel located in the neighborhood of the pixel of interest. Although the first to fourth difference circuits 1201 to 1204 perform difference processing irrespective of whether the pixel of interest is a G, R or B pixel, the fifth to eighth difference circuits 1205 to 1208 perform difference processing only in the case where the pixel of interest is a G pixel.

First to eighth ABS circuits 1209 to 1216 output the absolute values of the results (output data) of the difference processing performed respectively by the first to eighth difference circuits 1201 to 1208.

Like the defect determination circuit 215 shown in FIG. 2, a defect determination circuit 1217 outputs a defect flag and a black-and-white flag in accordance with the signs (positive or negative) of the results of the difference processing performed by the first to eighth difference circuits 1201 to 1208. If the pixel of interest is a G pixel, the defect determination circuit 1217 references the signs of the results of the difference processing performed by the first to eighth difference circuits 1201 to 1208. If the pixel of interest is either an R or B pixel, the defect determination circuit 1217 references the signs of the results of the difference processing performed by the first to fourth difference circuits 1201 to 1204.

Like the threshold determination circuit 216 shown in FIG. 2, a threshold determination circuit 1218 compares the absolute values of the results of the difference processing, which have been input from the first to eighth ABS circuits 1209 to 1216, with an arbitrarily set threshold. Based on the comparison results, the threshold determination circuit 1218 obtains a first determination value indicating the possibility that the signal from the pixel of interest is a defective pixel signal. Like the correlation determination circuit 217 shown in FIG. 2, a correlation determination circuit 1219 compares the magnitudes of the absolute values of results of the difference processing, which have been input from the first to eighth ABS circuits 1209 to 1216. Based on the comparison results, the correlation determination circuit 1219 obtains a second determination value indicating the possibility that the signal from the pixel of interest is a defective pixel signal.

Note that if the pixel of interest is a G pixel, the threshold determination circuit 1218 and the correlation determination circuit 1219 reference the absolute values of the results of the difference processing obtained through the first to eighth ABS circuits 1209 to 1216. If the pixel of interest is either an R or B pixel, the threshold determination circuit 1218 and the correlation determination circuit 1219 reference the absolute values of the results of the difference processing obtained through the first to fourth ABS circuits 1209 to 1212.

Then, as in the case with FIG. 2, a multiplier 218 obtains the third determination value by multiplying the first determination value and the second determination value, and the third determination value is input into the defective pixel correction circuit 106 via the selector 219.

As described above, the defective pixel detection circuit 105 according to the present embodiment obtains the first determination value indicating the magnitude of the difference in signal level between the pixel of interest and a plurality of pixels located in the neighborhood of the pixel of interest. The first determination value is a value that increases as the difference in the signal level between the pixel of interest and the neighboring pixels increases. The defective pixel detection circuit 105 also obtains the second determination value indicating the width of distribution of the magnitude of the difference in signal level between the pixel of interest and a plurality of neighboring pixels. The second determination value is a value that increases as the width of distribution of the magnitude of the difference in signal level between the pixel of interest and a plurality of neighboring pixels decreases. The defective pixel detection circuit 105 multiplies the first determination value D1 and the second determination value D2 and determines that the higher the value obtained by the multiplication, the higher is the possibility that the signal from the pixel of interest is a defective pixel signal. Note that if this value obtained by the multiplication is greater than or equal to a threshold, the defective pixel detection circuit 105 may determine the signal of the pixel of interest as a defective pixel signal. Alternatively, the defective pixel detection circuit 105 may determine the signal from the pixel of interest as a defective pixel signal if both the first and second determination values D1 and D2 are greater than or equal to a threshold.

Furthermore, since the defective pixel correction circuit 106 determines, based on the value obtained by the multiplication, the extent to which the pixel of interest is to be corrected or whether or not to correct the pixel of interest, it is possible to reduce the influence of a defective pixel more precisely than with the conventional techniques.

Note that a defective pixel does not always exist independently, and there is the possibility that two defective pixels may exist side by side. In consideration of this, in the case where a pixel whose signal level is close to that of the pixel of interest but very different from those of the other neighboring pixels is present around the pixel of interest, the defective pixel detection circuit 105 may perform determination of a defective pixel while excluding the signal level of this pixel.

Furthermore, although the above embodiments have been described taking, as an example, the processing for detecting a defective pixel performed by an imaging apparatus such as a digital camera or a video camera, the present invention is not intended to be limited thereto. For example, a personal computer having installed therein an application with image processing functions may perform the above-described processing on an image signal acquired from a detachable storage medium or via a network, in accordance with a program read from a memory (not shown).

Furthermore, in the present embodiment, although the defect level generated by the threshold determination circuit and the defect level generated by the correlation determination circuit are 8 bits, both the defect levels may have different bit widths.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent application No. 2010-073472 filed on Mar. 26, 2010, which is hereby incorporated by reference herein in its entirety.

The invention claimed is:

1. An image processing apparatus for detecting, from image data generated by an image sensor constituted by a plurality of pixels, a signal from a defective pixel of the image sensor, comprising:
   a first determination unit configured to obtain a first determination value indicating a magnitude of a difference in signal level between a pixel of interest and a plurality of pixels located in the neighborhood of the pixel of interest;
a second determination unit configured to obtain a second determination value indicating a width of distribution of the difference in signal level between the pixel of interest and the plurality of pixels located in the neighborhood of the pixel of interest; and
a detection unit configured to detect whether or not the signal from the pixel of interest is a defective pixel signal, using the first determination value and the second determination value,
wherein
the first determination unit obtains the first determination value by obtaining differences in signal level between the pixel of interest and each of the plurality of pixels located in the neighborhood of the pixel of interest, obtaining, from each of the differences, a value indicating a possibility that the signal from the pixel of interest is a defective pixel signal, and multiplying the obtained values,
the first determination value is a value that increases as the magnitude of the difference increases, and the second determination value is a value that increases as the width of distribution of the magnitude of the difference decreases, and
the detection unit detects the signal from the pixel of interest as a defective pixel signal when both the first determination value and the second determination value are greater than or equal to respective predetermined thresholds.

2. The image processing apparatus according to claim 1, further comprising a correction unit configured to, when the detection unit detects the signal from the pixel of interest as the defective pixel signal, correct the signal level of the pixel of interest, using a correction value obtained from the signal levels of the pixels located in the neighborhood of the pixel of interest.

3. The image processing apparatus according to claim 1, further comprising:
a processing unit configured to perform high-pass filter processing on a region including the pixel of interest, in a plurality of directions centered on the pixel of interest,
wherein the first determination unit obtains the first determination value from an absolute value of the result of the high-pass filter processing, and
the second determination unit obtains the second determination value from the width of distribution of the absolute value of the result of the high-pass filter processing.

4. The image processing apparatus according to claim 3, wherein
the processing unit performs low-pass filter processing on the region including the pixel of interest, in the plurality of directions centered on the pixel of interest, before performing the high-pass filter processing, and
the processing unit performs the low-pass filter processing in one of the directions centered on the pixel of interest, and then performs the high-pass filter processing in another one of the directions centered on the pixel of interest and different from the direction of the low-pass filter processing.

5. The image processing apparatus according to claim 3, further comprising:
a plurality of the processing unit configured to perform high-pass filter processing in different bands;
a plurality of the first determination unit and a plurality of the second determination unit, which are provided corresponding to the plurality of the processing unit; and
a selection unit configured to select a value obtained from the first determination value and the second determination value obtained from the first determination unit and the second determination unit that correspond to one of the processing units.

6. An image processing apparatus for detecting, from image data generated by an image sensor constituted by a plurality of pixels, a signal from a defective pixel of the image sensor, comprising:
a first determination unit configured to obtain a first determination value indicating a magnitude of a difference in signal level between a pixel of interest and a plurality of pixels located in the neighborhood of the pixel of interest;
a second determination unit configured to obtain a second determination value indicating a width of distribution of the magnitude of the difference in signal level between the pixel of interest and the plurality of pixels located in the neighborhood of the pixel of interest; and
a correction unit configured to, using a value obtained by multiplying the first determination value and the second determination value, correct the signal level of the pixel of interest by weighting and adding the signal level of the pixel of interest and a correction value obtained from the signal levels of the pixels located in the neighborhood of the pixel of interest,
wherein
the first determination unit obtains the first determination value by obtaining differences in signal level between the pixel of interest and each of the plurality of pixels located in the neighborhood of the pixel of interest, obtaining, from each of the differences, a value indicating a possibility that the signal from the pixel of interest is a defective pixel signal, and multiplying the obtained values,
the first determination value is a value that increases as the magnitude of the difference increases, and the second determination value is a value that increases as the width of distribution of the magnitude of the difference decreases, and
the correction unit assigns a higher weight to the correction value as the value obtained by multiplying the first determination value and the second determination value increases.

7. The image processing apparatus according to claim 6, further comprising:
a processing unit configured to perform high-pass filter processing on a region including the pixel of interest, in a plurality of directions centered on the pixel of interest,
wherein the first determination unit obtains the first determination value from an absolute value of the result of the high-pass filter processing, and the second determination unit obtains the second determination value from the width of distribution of the absolute value of the result of the high-pass filter processing.

8. The image processing apparatus according to claim 7, wherein
the processing unit performs, before performing the high-pass filter processing, low-pass filter processing on the region including the pixel of interest, in the plurality of directions centered on the pixel of interest, and
the processing unit performs the low-pass filter processing in one of the directions centered on the pixel of interest, and then performs the high-pass filter processing in another one of the directions centered on the pixel of interest and different from the direction of the low-pass filter processing.

9. The image processing apparatus according to claim 7, further comprising:
   a plurality of the processing unit configured to perform high-pass filter processing in different bands;
   a plurality of the first determination unit and a plurality of the second determination unit, which are provided corresponding to the plurality of the processing unit; and
   a selection unit configured to select a value obtained from the first determination value and the second determination value obtained by the first determination unit and the second determination unit that correspond to one of the processing units.

10. A control method for an image processing apparatus that detects, from image data generated by an image sensor constituted by a plurality of pixels, a signal from a defective pixel of the image sensor, the method comprising:
   a step, performed by a first determination unit, of obtaining a first determination value indicating a magnitude of a difference in signal level between a pixel of interest and a plurality of pixels located in the neighborhood of the pixel of interest, the first determination value increasing as the magnitude of the difference increases;
   a step, performed by a second determination unit, of obtaining a second determination value indicating a width of distribution of the magnitude of the difference in signal level between the pixel of interest and the plurality of pixels located in the neighborhood of the pixel of interest, the second determination value increasing as the width of distribution of the magnitude of the difference decreases; and
   a step, performed by a detection unit, of detecting the signal from the pixel of interest as a defective pixel signal, when both the first determination value and the second determination value are greater than or equal to respective predetermined thresholds,
   wherein in the step of obtaining the first determination value, the first determination unit obtains the first determination value by obtaining differences in signal level between the pixel of interest and each of the plurality of pixels located in the neighborhood of the pixel of interest, obtaining, from each of the differences, a value indicating a possibility that the signal from the pixel of interest is a defective pixel signal, and multiplying the obtained values.

11. A control method for an image processing apparatus that detects, from image data generated by an image sensor constituted by a plurality of pixels, a signal from a defective pixel of the image sensor, the method comprising:
   a step, performed by a first determination unit, of obtaining a first determination value indicating a magnitude of a difference in signal level between a pixel of interest and a plurality of pixels located in the neighborhood of the pixel of interest, the first determination value increasing as the magnitude of the difference increases;
   a step, performed by a second determination unit, of obtaining a second determination value indicating a width of distribution of the magnitude of the difference in signal level between the pixel of interest and the plurality of pixels located in the neighborhood of the pixel of interest, the second determination value increasing as the width of distribution of the magnitude of the difference decreases; and
   a step, performed by a correction unit, of correcting the signal level of the pixel of interest by weighing and adding the signal level of the pixel of interest and a correction value obtained from the signal levels of the pixels located in the neighborhood of the pixel of interest, such that the correction value is assigned a higher weight as a value obtained by multiplying the first determination value and the second determination value increases,
   wherein in the step of obtaining the first determination value, the first determination unit obtains the first determination value by obtaining differences in signal level between the pixel of interest and each of the plurality of pixels located in the neighborhood of the pixel of interest, obtaining, from each of the differences, a value indicating a possibility that the signal from the pixel of interest is a defective pixel signal, and multiplying the obtained values.

12. An image processing apparatus for detecting, from image data generated by an image sensor constituted by a plurality of pixels, a signal from a defective pixel of the image sensor, comprising:
   a first determination unit configured to obtain a first determination value indicating a magnitude of a difference in signal level between a pixel of interest and a plurality of pixels located in the neighborhood of the pixel of interest;
   a second determination unit configured to obtain a second determination value indicating a width of distribution of the difference in signal level between the pixel of interest and the plurality of pixels located in the neighborhood of the pixel of interest; and
   a detection unit configured to detect whether or not a signal from the pixel of interest is a defective pixel signal, using the first determination value and the second determination value,
   wherein the first determination unit obtains the first determination value by obtaining differences in signal level between the pixel of interest and each of the plurality of pixels located in the neighborhood of the pixel of interest, obtaining, from each of the differences, a value indicating a possibility that the signal from the pixel of interest is a defective pixel signal, and multiplying the obtained values.

13. The image processing apparatus according to claim 12, further comprising a correction unit configured to correct the signal level of the pixel of interest, when the detection unit detects the signal from the pixel of interest as the defective pixel signal, using a correction value obtained from the signal levels of the pixels located in the neighborhood of the pixel of interest.

14. The image processing apparatus according to claim 12, further comprising:
   a processing unit configured to perform high-pass filter processing on a region including the pixel of interest, in a plurality of directions centered on the pixel of interest,
   wherein the first determination unit obtains the first determination value from an absolute value of the result of the high-pass filter processing, and
   the second determination unit obtains the second determination value from the width of distribution of the absolute value of the result of the high-pass filter processing.

15. The image processing apparatus according to claim 14, wherein
   the processing unit performs low-pass filter processing on the region including the pixel of interest, in the plurality of directions centered on the pixel of interest, before performing the high-pass filter processing, and the processing unit performs the low-pass filter processing in one of the directions centered on the pixel of interest, and then performs the high-pass filter processing in another one of the directions centered on the pixel of interest and different from the direction of the low-pass filter processing.

16. The image processing apparatus according to claim 15, further comprising:
 a plurality of the processing unit configured to perform high-pass filter processing in different bands;
 a plurality of the first determination unit and a plurality of the second determination unit, which are provided corresponding to the plurality of processing units; and
 a selection unit configured to select a value obtained from the first determination value and the second determination value obtained from one of the first determination units and one of the second determination units that correspond to one of the processing units.

* * * * *